(12) United States Patent
Dubay et al.

(10) Patent No.: US 7,229,097 B2
(45) Date of Patent: Jun. 12, 2007

(54) SNAP-IN CAPSULE FOR STEERING COLUMNS

(75) Inventors: Robert W. Dubay, Saginaw, MI (US); Timothy D. Beach, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 71 days.

(21) Appl. No.: 11/037,313

(22) Filed: Jan. 18, 2005

(65) Prior Publication Data

US 2006/0157965 A1    Jul. 20, 2006

(51) Int. Cl.
*B62D 1/19*        (2006.01)
(52) U.S. Cl. ..................................... 280/777
(58) Field of Classification Search ............. 280/775, 280/777, 779, 780; 74/493
See application file for complete search history.

(56) References Cited

U.S. PATENT DOCUMENTS

| | | | |
|---|---|---|---|
| 4,884,778 A | 12/1989 | Yamamoto | |
| 5,605,073 A * | 2/1997 | Milton et al. | 74/492 |
| 5,775,172 A * | 7/1998 | Fevre et al. | 280/777 |
| 5,788,279 A * | 8/1998 | Pfannebecker | 74/492 |
| 6,062,100 A | 5/2000 | Sarsfield et al. | |
| 6,176,151 B1 | 1/2001 | Cymbal | |
| 6,431,601 B2 * | 8/2002 | Maekawa | 280/777 |
| 6,450,532 B1 * | 9/2002 | Ryne et al. | 280/777 |
| 6,799,486 B2 * | 10/2004 | Manwaring et al. | 280/777 |
| 2002/0024209 A1 * | 2/2002 | Seamon et al. | 280/777 |
| 2003/0226417 A1 * | 12/2003 | Manwaring et al. | 74/492 |
| 2005/0200113 A1 * | 9/2005 | Cymbal et al. | 280/777 |
| 2005/0225068 A1 * | 10/2005 | Ishida et al. | 280/775 |
| 2005/0269812 A1 * | 12/2005 | Yamada | 280/777 |

* cited by examiner

*Primary Examiner*—Paul N. Dickson
*Assistant Examiner*—Barry Gooden, Jr.
(74) *Attorney, Agent, or Firm*—Michael D. Smith

(57) ABSTRACT

The invention provides a snap-in capsule for releasibly connecting a steering column to a vehicle. The snap-in capsule includes a metal insert for reducing creep of the steering column with respect to the vehicle. The metal insert has top and bottom surfaces and a slot extending along an axis for receiving a bolt. The snap-in capsule also includes a plastic capsule body for providing a mechanical fuse between the metal insert and the steering column. The plastic capsule body has a first snap-fit portion being deformable to receive the metal insert and fix the plastic capsule body and the metal insert with respect to one another.

14 Claims, 5 Drawing Sheets

SNAP-IN CAPSULE FOR STEERING COLUMNS

FIELD OF THE INVENTION

The invention relates to capsules for releasibly connecting a steering column to a vehicle and more particularly to capsules that connect to a steering column in snap-fit relation.

BACKGROUND OF THE INVENTION

Many steering columns are designed with cast aluminum capsules that are specially injected. For example, the capsule and a bracket fixed to the steering column are held together with a fixture in a desired orientation relative to one another. Plastic is injected in apertures defined by the capsule and the bracket to connect the capsule and the bracket together. Other steering columns include capsules that snap-fit with bracket. Still other capsules include plastic portions and metal portions that slidably engage one another and sandwich the bracket.

SUMMARY OF THE INVENTION AND ADVANTAGES

The invention provides a snap-in capsule for releasibly connecting a steering column to a vehicle. The snap-in capsule includes a metal insert for reducing creep of the steering column with respect to the vehicle. The metal insert has top and bottom surfaces and a slot extending along an axis for receiving a bolt. The snap-in capsule also includes a plastic capsule body for providing a mechanical fuse between the metal insert and the steering column. The plastic capsule body has a first snap-fit portion being deformable to receive the metal insert and fix the plastic capsule body and the metal insert with respect to one another.

The invention reduces the costs assembling a capsule to a bracket. For example, the metal insert and plastic capsule body of the snap-in capsule can be assembled by hand without the use of special tools or fixtures. Also, the assembled snap-in capsule can be assembled to the bracket without special tools or fasteners. The assembled snap-in capsule concurrently provides structure defining a mechanical fuse and structure to reduce the likelihood of creep.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
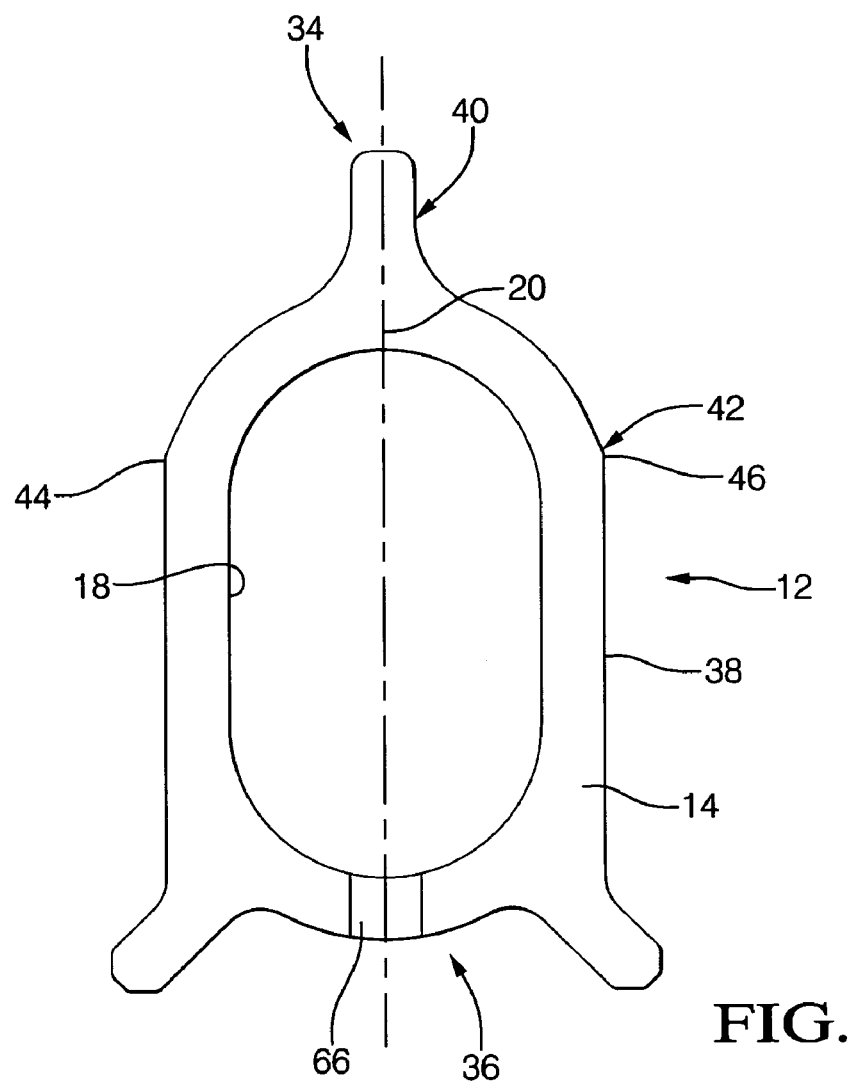
FIG. 1 is a bottom view of a first exemplary metal insert.
Figure 2:
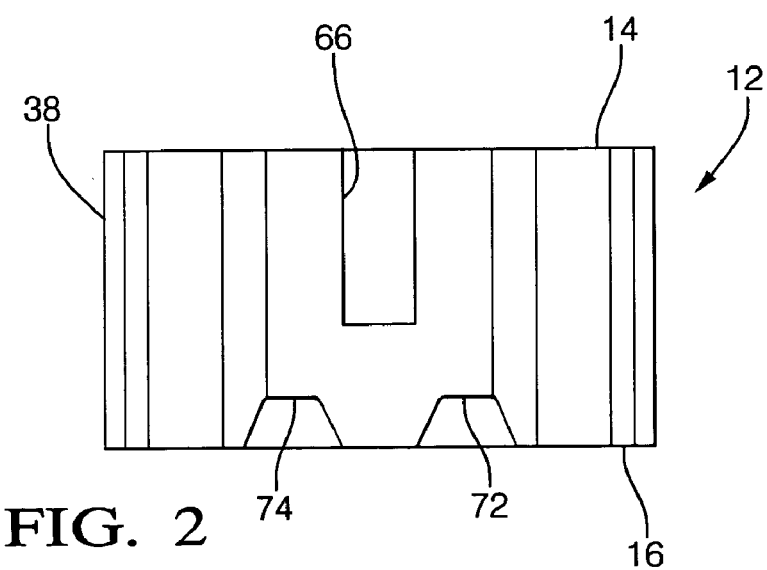
FIG. 2 is an inverted front view of the first exemplary metal insert.

A plurality of different embodiments of the invention are shown in the Figures of the application. Similar features are shown in the various embodiments of the invention. Similar features have been numbered with a common two-digit reference numeral and have been differentiated by a third digit placed before the two common digits. Similar features are structured similarly, operate similarly, and/or have the same function unless otherwise indicated by the drawings or this specification. Furthermore, particular features of one embodiment can replace corresponding features in another embodiment unless otherwise indicated by the drawings or this specification.

Referring now to FIGS. 1–2, 5–8, and 9–10, the invention provides a snap-in capsule 10 for releasibly connecting a steering column 84 to a vehicle. The snap-in capsule 10 includes a metal insert 12 for reducing creep of the steering column 84 with respect to the vehicle. The metal insert 12 has bottom and top surfaces 14, 16 and a slot 18 extending along an axis 20 for receiving a bolt. The snap-in capsule 10 also includes a plastic capsule body 22 for providing a mechanical fuse between the metal insert 12 and the steering column 84. The plastic capsule body 22 has a first snap-fit portion 24 being deformable to receive the metal insert 12 and fix the plastic capsule body 22 and the metal insert 12 with respect to one another.

The metal insert 12 can be formed from aluminum or any other metal and reduces likelihood of creep between the steering column 84 and the vehicle. The metal insert 12 includes an outer edge 38 with a first portion 40 and a second portion 42 and extends along the axis 20 between a first end 34 and a second end 36. The first portion 40 is received in a correspondingly shaped portion of a window 64 of the plastic capsule body when the metal insert 12 and the plastic capsule body 22 are engaged with respect to another. The first portion 40 and the window 64 cooperate to guide movement of the metal insert 12 and the plastic capsule body 22 relative to one another. One or both of the metal insert 12 and the plastic capsule body 22 are moved toward the other along a path extending normal to the axis 20. During the movement, the first snap-fit portion 24 is deformed. Movement along the path stops when projections 68, 70 of the plastic capsule body 22 are received in notches 72, 74, respectively, in the top surface 16. Also, when the projections 68, 70 are received in notches 72, 74, the first snap-fit portion 24 snaps back from a deformed orientation, at least partially, to engage a portion 66 of the bottom surface 14. In the first exemplary embodiment of the invention, the surface portion 66 is recessed with respect to the rest of the bottom surface 14. The plastic capsule body 22 and the metal insert 12 are engageable with one another by hand assembly without the use of tooling.

After the metal insert 12 and the plastic capsule body 22 have been engaged with respect to one another, the assembled snap-in capsule 10 can be assembled to a bracket 48 to form a connection assembly 76. The plastic capsule body 22 includes a second snap-fit portion 26 for engaging the steering column 84. The second snap-fit portion 26 is spaced from the first snap-fit portion 24 along the axis 20. The second snap-fit portion 26 includes a projection 28 disposed along the axis 20 and extending normal to the axis 20. The bracket 48 includes a notch 50 receiving the assembled snap-in capsule 10 and a locking portion 52 engaging the second snap-fit portion 26. One or both of the bracket 28 and the snap-in capsule 10 are moved toward the other along the axis 20 to position the snap-in capsule 10 in the notch 50 until the locking portion 52 engages the second snap-fit portion 26. During movement of the bracket 48 and/or the snap-in capsule 10 along the axis 20, the projection 28 is deformed and snaps back, at least partially, at the end of movement. The plastic capsule body can define a peripheral channel 82 receiving an edge of the notch 50 to guide movement along the axis 20. The bracket 48 and the snap-in capsule 10 are engageable with one another by hand assembly without the use of tooling.

In the first exemplary embodiment of the invention, the first portion 40 is surrounded by the plastic capsule body 22 and the second portion 42 is exposed. The second portion 42 includes first and second peripheral surfaces 44, 46 in parallel relation to one another and on opposite sides of the axis 20. The first and second peripheral surfaces 44, 46 are disposed between the first and second ends 34, 36 of the metal insert 12 along the axis 20. The bracket 48 includes third and fourth peripheral surfaces 54, 56 that engage the first and second peripheral surfaces 44, 46 to define a press-fit connection 62 between the bracket 48 and the metal insert 12. In the first exemplary embodiment, the first and second peripheral surfaces 44, 46 extend in parallel relation to one another on opposite sides of the axis 20. The third and fourth peripheral surfaces 54, 56 also extend in parallel relation to one another on opposite sides of the axis 20.

Figure 3:
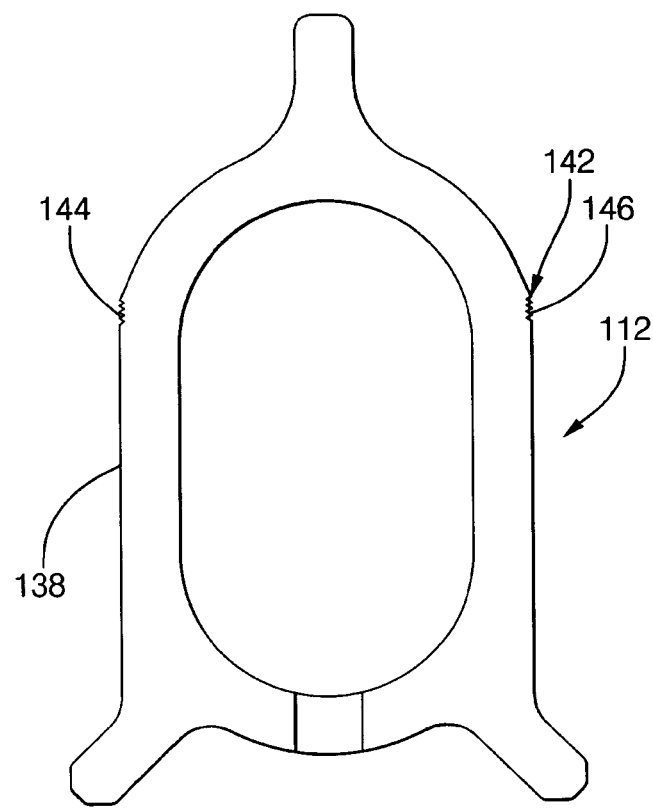
FIG. 3 is a bottom view of a second exemplary metal insert.
Figure 4:
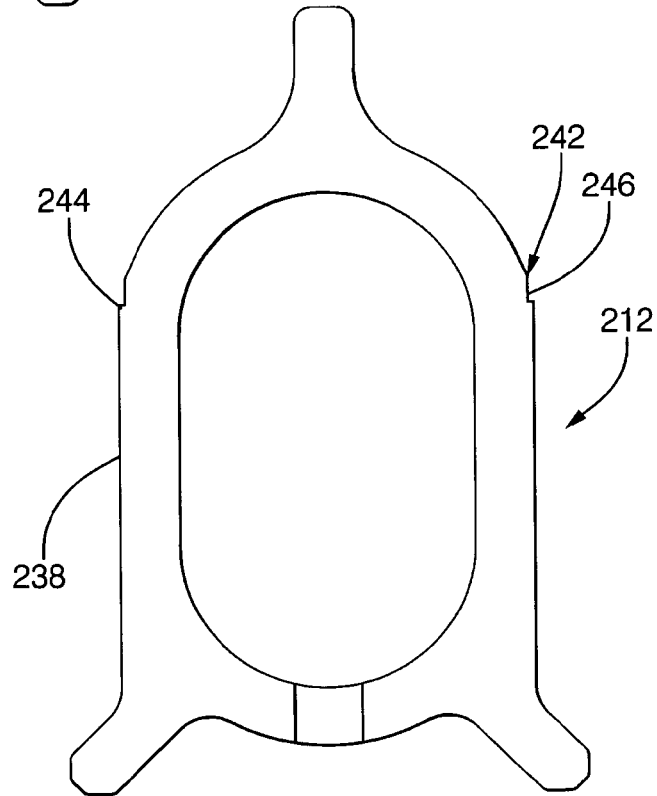
FIG. 4 is a bottom view of a third exemplary metal insert.
Figure 5:
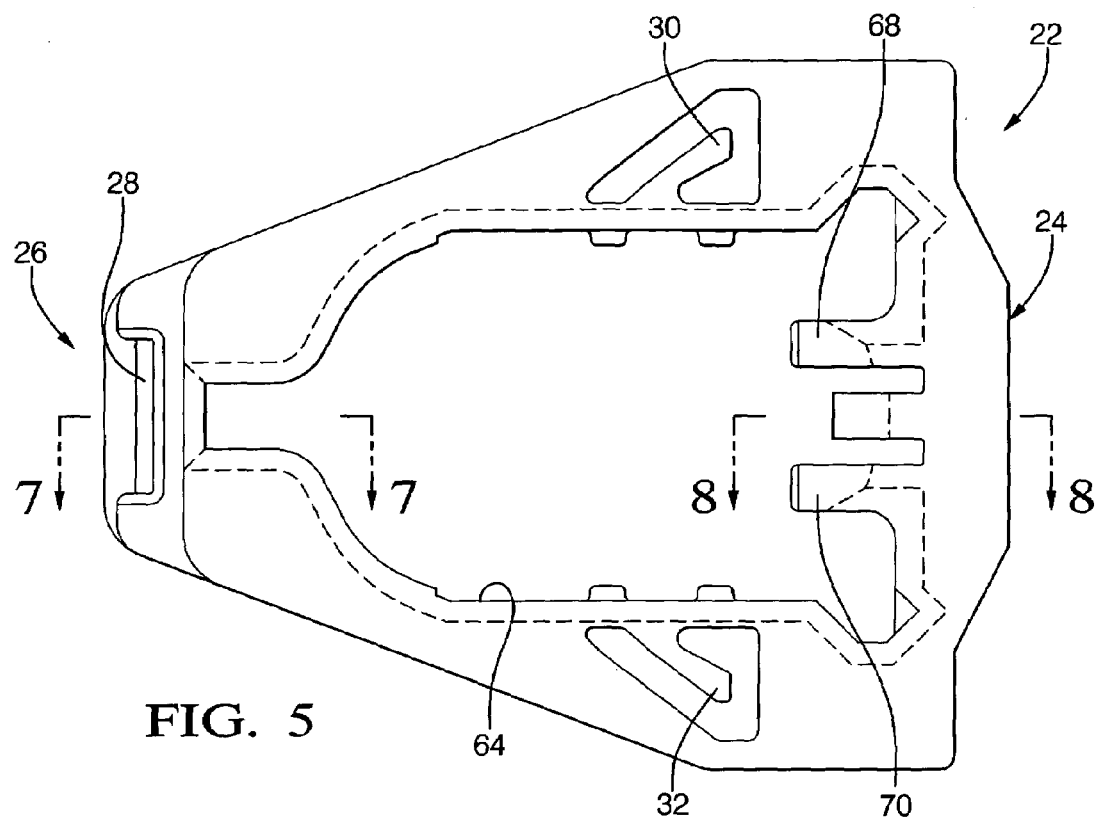
FIG. 5 is a top view of a first exemplary plastic capsule body.
Figure 6:
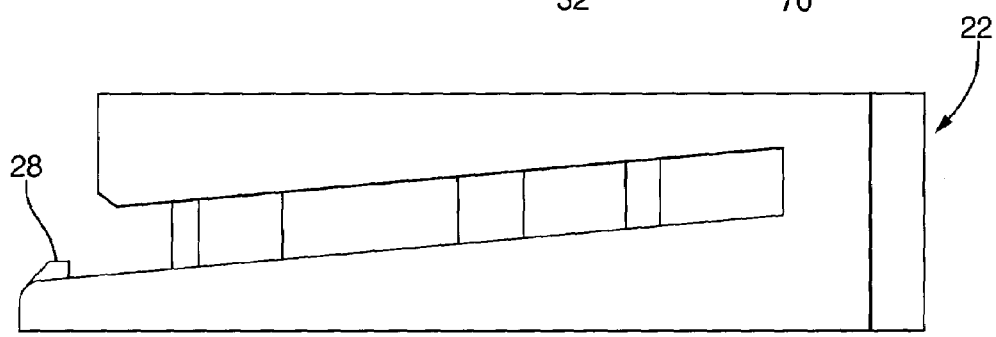
FIG. 6 is a left side view of the first exemplary plastic capsule body.
Figure 7:
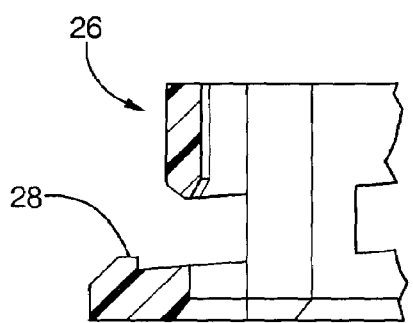
FIG. 7 is a cross-sectional view taken along section lines 7—7 in FIG. 5.
Figure 8:
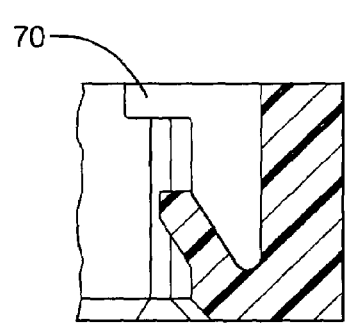
FIG. 8 is a cross-sectional view taken along section lines 8—8 in FIG. 5.

The profile or shape of the peripheral surfaces can be modified to enhance assembly, for example to promote hand assembly of the snap-in capsule 10 and the bracket 48. Referring now to FIG. 3, in a second exemplary embodiment of the invention, a metal insert 112 includes an outer edge 138 with a second portion 142 having first and second peripheral surfaces 144, 146 that are serrated. Referring now to FIG. 4, in a third exemplary embodiment of the invention, a metal insert 212 includes an outer edge 238 with a second portion 242 having first and second peripheral surfaces 244, 246 that define respective mirrored shoulders. The metal inserts 112, 212 are otherwise similar to the metal insert 12.

Figure 12:
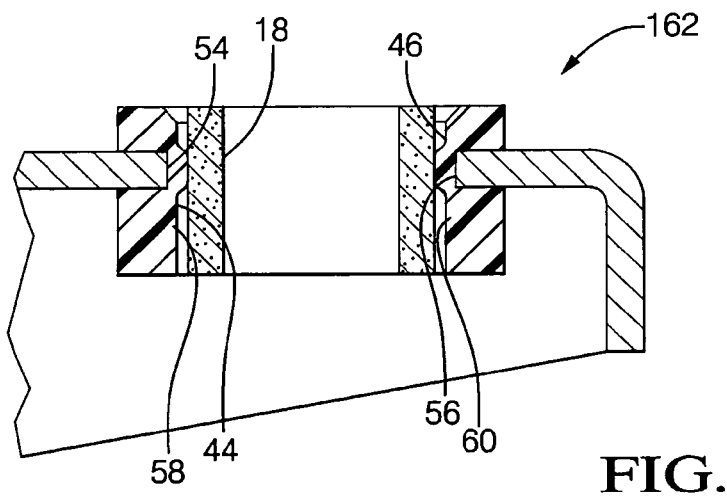
FIG. 12 is a cross-sectional view taken along section lines 12—12 in FIG. 11.
Figure 10:
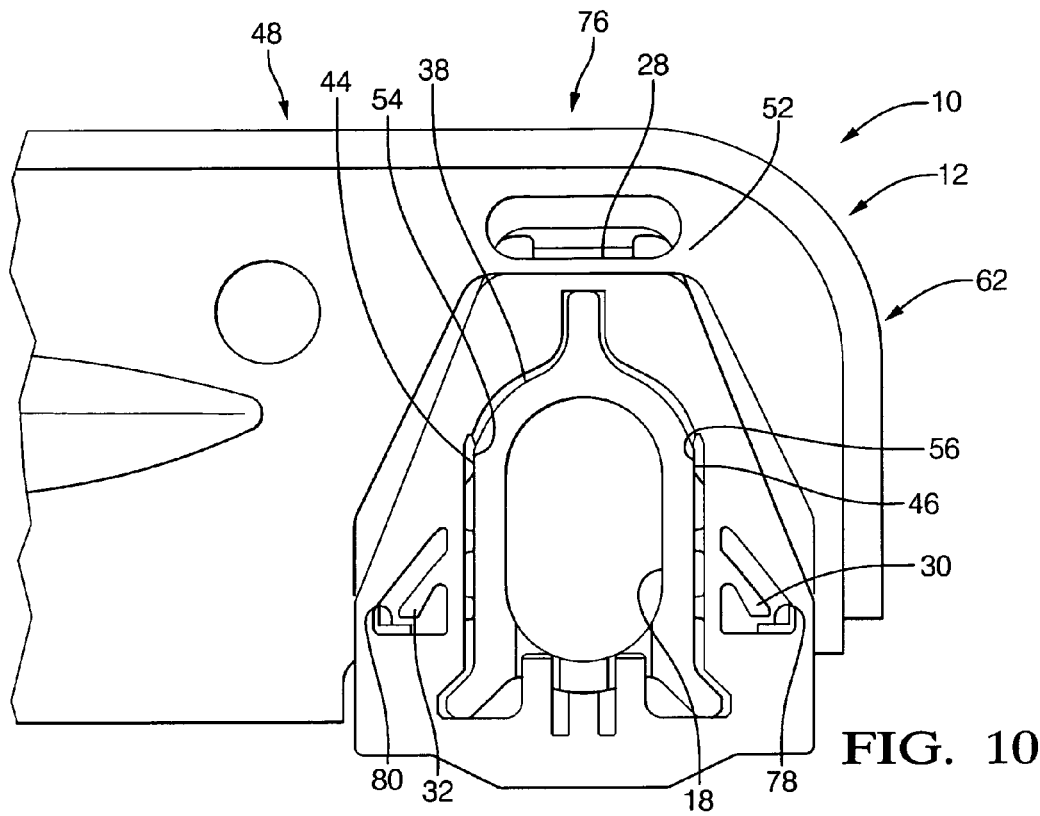
FIG. 10 is a top view of a first exemplary assembly including the first exemplary metal insert, the first exemplary plastic capsule body, and the first exemplary bracket.
Figure 11:
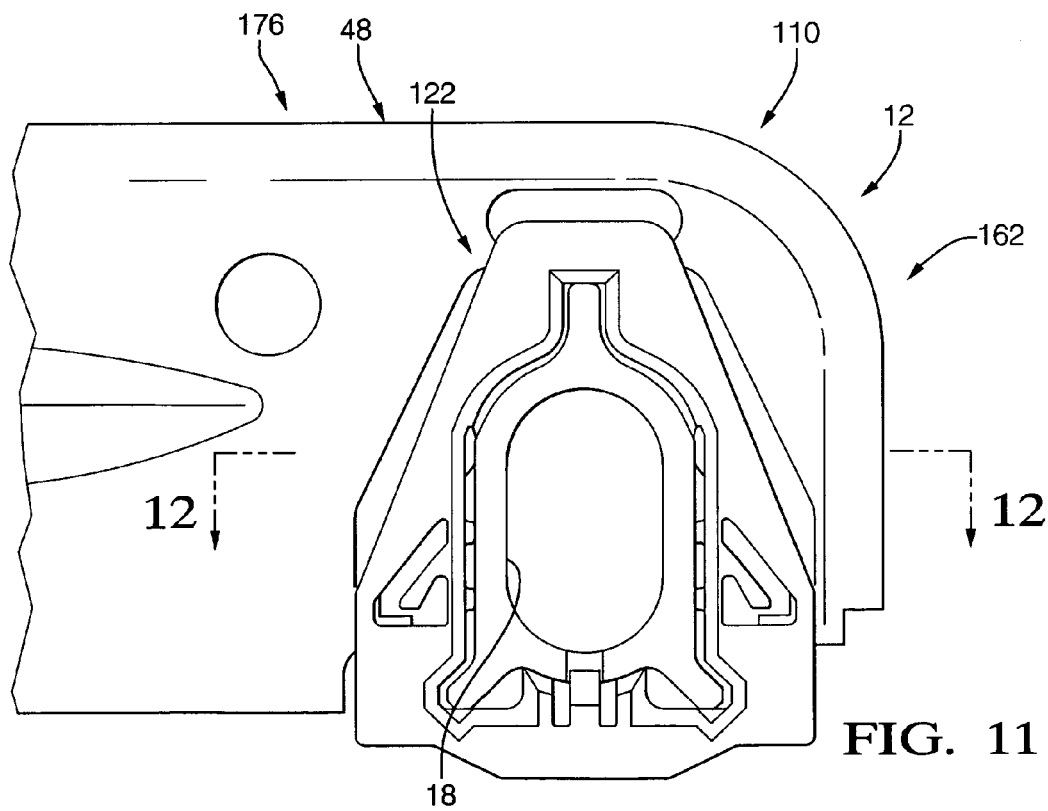
FIG. 11 is a top view of a second exemplary assembly including the first exemplary metal insert rotated one hundred and eighty degrees about an axis, a second exemplary plastic capsule body, and the first exemplary bracket.

In alternative embodiments of the invention, a portion of the plastic capsule body can fully encircle the metal insert 12, a portion of the plastic capsule body being disposed between the peripheral surfaces of the bracket 48 and the metal insert 12. Referring now to FIGS. 11 and 12, a connection assembly 176 includes a snap-in capsule 110 having the metal insert 12 and a plastic capsule body 122. A first covering portion 58 of the plastic capsule body 122 is disposed between the first and third peripheral surfaces 44, 54 and a second covering portion 60 is disposed between the second and fourth peripheral surfaces 46, 56. A press-fit connection 162 is formed between the surfaces 44, 46 and 54, 56, the first and second covering portions 58, 60 sandwiched between the surfaces 44, 46, 54, 56. The first and second covering portions 58, 60 substantially isolate the metal insert 12 and the bracket 48 from one another with respect to vibration. The dimensions of the metal insert 12 and/or the notch 50 of the bracket 48 may be modified as necessary depending on the use of the plastic capsule body 22 or the plastic capsule body 122. The plastic capsule bodies 22, 122 are otherwise similar.

In the first exemplary embodiment of the invention, the plastic capsule body 22 includes a third snap-fit portion 30 spaced from the first snap-fit portion 24 along the axis 20 for engaging the steering column 84 and a fourth snap-fit portion 32 spaced from the first snap-fit portion 24 along the axis 20 for engaging the steering column 84. The third snap-fit portion 30 and the fourth snap-fit portion 32 being disposed on opposite sides of the axis 20. The third and fourth snap-fit portions 30, 32 are spaced from the second snap-fit portion 26 and the press-fit connection 62 along the axis 20. During assembling movement of one or both of the snap-fin capsule 10 and the bracket 48 toward one along the axis 20, the third snap-fit portion 30 is deformed against a shoulder 78 toward the first snap-fit portion 24 and the fourth snap-fit portion 32 is deformed against a shoulder 80 toward the first snap-fit portion 24. Generally at the end of movement, the third and fourth snap-fit portions 30, 32 snap back, at least partially, around the shoulders 78, 80 and prevent the capsule from backing out during normal vehicle handling.

In operation during a vehicle crash, or impact situation, the driver of the vehicle and exert a force on the steering column 84 that will be applied along the axis. The second snap-fit portion 26 and the locking portion 52 disengage with respect to one another in response to a first predetermined level of force acting along the axis 20. The amount of force required to disengage the second snap-fit portion 26 and the locking portion 52 is less than the amount force required to disengage the metal insert 12 and the plastic capsule body 22 from one another. When the snap-in capsule 10 separates from the bracket 48, the second snap-fit portion 26 and the locking portion 52 disengage, the press-fit connection 62 is lost, and the third and fourth snap-fit portions 30, 32 are deformed toward the second snap-fit portion 26 by the shoulders 78, 80.

Figure 9:
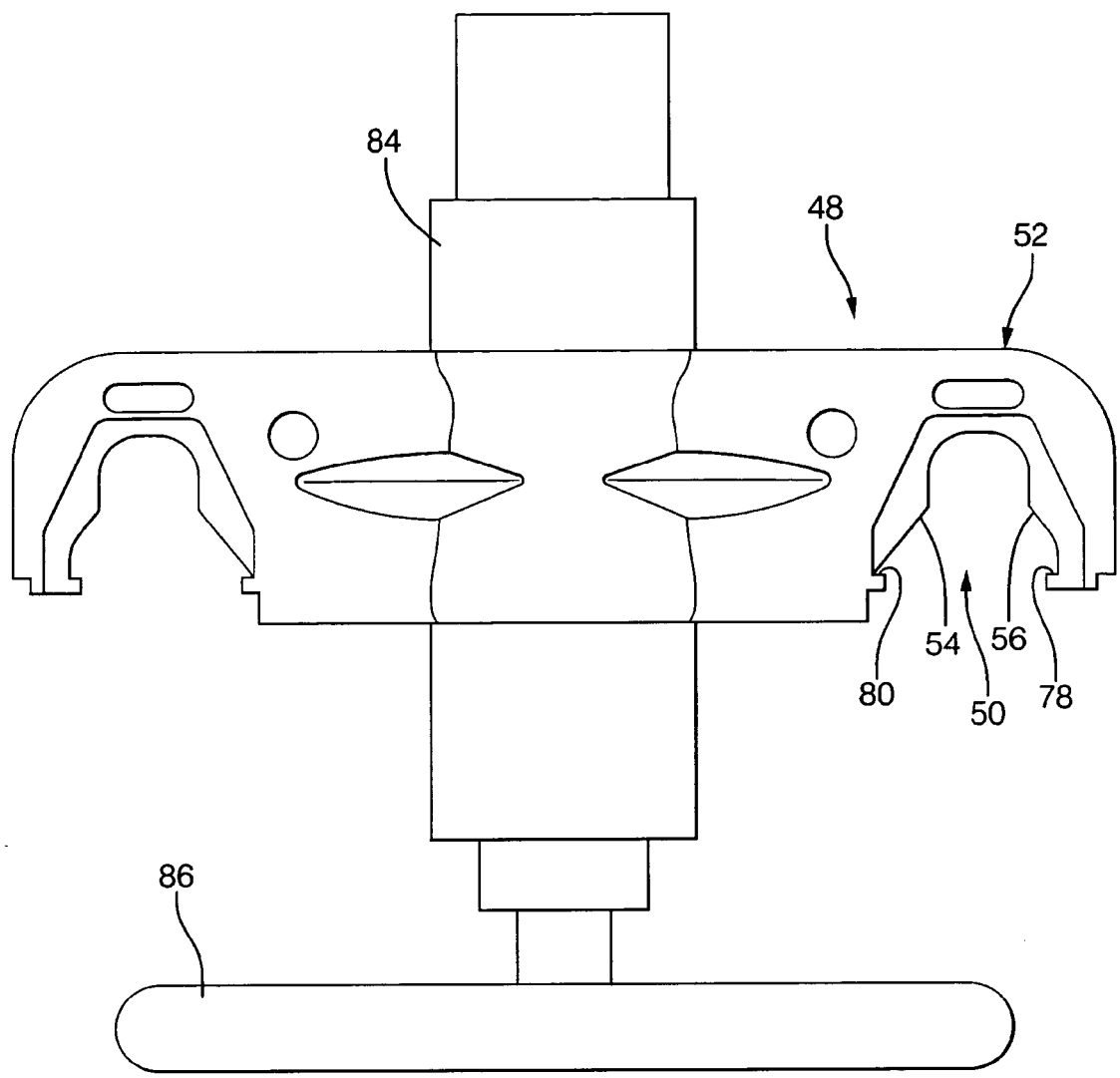
FIG. 9 is a top view of a first exemplary bracket.

Referring now to FIG. 9, the steering column 84 is operable to support a steering wheel 86. The steering column 84 is shown schematically. Alternative embodiments of the invention can include steering column 84s that are telescopically adjustable, moveable in rake or tilt adjustment, formed from two jackets, formed with at least one jacket and a tilt housing, or any other configuration of steering column 84 known in the art. The steering column 84 is fixed to the bracket 48 and the snap-in capsule 10 is engaged with the bracket 48 in snap-fit relation.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A snap-in capsule for reliably connecting a steering column to a vehicle, comprising:

a metal insert for reducing creep of the steering column with respect to the vehicle and having top and bottom surfaces and a slot extending along an axis for receiving a bolt;

a plastic capsule body for providing a mechanical fuse between said metal insert and the steering column, said plastic capsule body having a first snap-fit portion being deformable to receive said metal insert and fix said plastic capsule body and said metal insert with respect to one another;

wherein said metal insert further comprises first and second ends spaced from one another along said axis and said plastic capsule body engages said top and bottom surfaces at one of said first and second ends; and wherein said metal insert includes an outer edge and at least a first portion of said outer edge is covered by said plastic capsule body and at least a second portion of said outer edge is exposed.

2. The capsule of claim 1 wherein said second portion includes first and second peripheral surfaces in parallel relation to one another and on opposite sides of said axis for being urged together to define a press-fit connection.

3. The capsule of claim 2 wherein said first and second peripheral surfaces are disposed between said first and second ends along said axis.

4. The capsule of claim 3 wherein said first portion is disposed at one of said first and second ends.

5. The capsule of claim 2 wherein said first and second peripheral surfaces are serrated.

6. The capsule of claim 2 wherein said first and second peripheral surfaces define respective mirrored shoulder.

7. A connection assembly having snap-in capsule for releasibly connecting a steering column to a vehicle comprising:

a metal insert for reducing creep of the steering column with respect to the vehicle and having top and bottom surfaces and a slot extending along an axis for receiving a bolt;

a plastic capsule body for providing a mechanical fuse between said metal insert and the steering column, said plastic capsule body having a first snap-fit portion being deformable to axially receive said metal insert and fix said plastic capsule body and said metal insert with respect to one another and said plastic capsule body also having a second snap-fit portion; and a bracket for fixedly mounting to the steering column and having a notch receiving said metal insert and said plastic capsule body and a locking portion engaging said second snap-fit portion;

wherein said metal insert includes first and second peripheral surfaces in parallel relation to one another and on opposite sides of said axis and said notch includes third and fourth peripheral surfaces directly engaging said first and second peripheral surfaces in a press-fit connection; and wherein said plastic capsule body includes a first covering portion disposed between said first and third peripheral surfaces and a second covering portion disposed between said second and fourth peripheral surfaces to substantially isolate said metal insert and said bracket from one another with respect to vibration.

8. The connection assembly of claim 7 wherein said second snap-fit portion is spaced from said press-fit connection along said axis.

9. The connection assembly of claim 8 wherein said plastic capsule body further comprises:

a third snap-fit portion spaced from said second snap-fit portion along said axis for engaging said bracket, said press-fit connection disposed between said second snap-fit portion and said third snap-fit portion; and a fourth snap-fit portion spaced from said second snap-fit portion along said axis for engaging said bracket, where said fourth snap-fit portion and said third snap-fit portion being disposed on opposite sides of said axis and said press-fit connection disposed between said second snap-fit portion and said fourth snap-fit portion.

10. The connection assembly of claim 9 wherein said metal insert further comprises first and second ends spaced from one another along said axis on opposite sides of said press-fit connection and said plastic capsule body engages said top and bottom surfaces at only one of said first and second ends.

11. The connection assembly of claim 7 wherein said plastic capsule body defines a window and said metal insert is received in said window.

12. The connection assembly of claim 11 wherein said first snap-fit portion extends into said window.

13. The connection assembly of claim 7 wherein said plastic capsule body and said metal insert are engageable with one another by hand assembly without the use of tooling.

14. The connection assembly of claim 7 wherein said second snap-fit portion and said locking portion disengage with respect to one another in response to a first predetermined level of force acting along said axis and wherein said plastic capsule body and said metal insert remain engaged with one another in response to the first predetermined level of force acting along said axis.

* * * * *